United States Patent
Suzuki

(10) Patent No.: US 9,745,671 B2
(45) Date of Patent: Aug. 29, 2017

(54) CARBONIZATION METHOD AND CARBON FIBER PRODUCTION METHOD

(71) Applicant: TOHO TENAX CO., LTD., Tokyo (JP)

(72) Inventor: Yoshinori Suzuki, Shizuoka (JP)

(73) Assignee: TOHO TENAX CO., LTD., Tokyo (JP)

( * ) Notice: Subject to any disclaimer, the term of this patent is extended or adjusted under 35 U.S.C. 154(b) by 0 days.

(21) Appl. No.: 14/897,924

(22) PCT Filed: Jul. 24, 2014

(86) PCT No.: PCT/JP2014/069552
§ 371 (c)(1),
(2) Date: Dec. 11, 2015

(87) PCT Pub. No.: WO2015/012349
PCT Pub. Date: Jan. 29, 2015

(65) Prior Publication Data
US 2016/0130732 A1    May 12, 2016

(30) Foreign Application Priority Data
Jul. 26, 2013    (JP) .................. 2013-155364

(51) Int. Cl.
*D01F 9/22*    (2006.01)
*D01F 9/14*    (2006.01)
(Continued)

(52) U.S. Cl.
CPC .............. *D01F 9/22* (2013.01); *C01B 31/02* (2013.01); *D01F 9/14* (2013.01); *D01F 9/32* (2013.01); *D10B 2101/12* (2013.01)

(58) Field of Classification Search
CPC ........ D01F 9/22; D10B 2101/12; C01B 31/02
See application file for complete search history.

(56) References Cited

U.S. PATENT DOCUMENTS 6,372,192 B1 *  4/2002  Paulauskas ............... D01F 9/12
                                                     204/155
2011/0079505 A1 *  4/2011  White .................. D01F 9/32
                                                     204/157.43

FOREIGN PATENT DOCUMENTS

CN    1442519 A    9/2003
DE    197 49 475 A1    5/1999
(Continued)

OTHER PUBLICATIONS

Machine English translation of JP2007023457.*
Li, Jiangling, et al. "Carbon nanowalls grown by microwave plasma enhanced chemical vapor deposition during the carbonization of polyacrylonitrile fibers." Journal of Applied Physics 113.2 (2013): 024313.*
(Continued)

*Primary Examiner* — Richard M Rump
(74) *Attorney, Agent, or Firm* — Norris McLaughlin & Marcus, P.A.

(57) ABSTRACT

A carbonization method of carbonizing precursor fibers that are being conveyed includes carbonization performed using a plurality of carbonization furnaces for heating fibers arranged in the direction in which the fibers are conveyed. The plurality of carbonization furnaces include at least one carbonization furnace that heats the fibers using plasma when the fibers are passing through the inside of the at least one carbonization furnace. A carbon fiber production method includes a carbonization process of carbonizing precursor fibers that are being conveyed. The carbonization process is performed with the above carbonization method.

12 Claims, 5 Drawing Sheets

(51) Int. Cl.
*D01F 9/32* (2006.01)
*C01B 31/02* (2006.01)

(56) References Cited

FOREIGN PATENT DOCUMENTS

| | | |
|---|---|---|
| JP | S47-37216 | 9/1972 |
| JP | S58144125 A | 8/1983 |
| JP | S6245725 A | 2/1987 |
| JP | 2000-154430 A | 6/2000 |
| JP | 2002-302828 A | 10/2002 |
| JP | 2007-023457 A | 2/2007 |
| JP | 2007-211359 A | 8/2007 |
| JP | 2008-095257 A | 4/2008 |
| RU | 2 343 235 C1 | 1/2009 |

OTHER PUBLICATIONS

Karacan, Ismail, and Abdullah Gül. "Carbonization behavior of oxidized viscose rayon fibers in the presence of boric acid—phosphoric acid impregnation." Journal of Materials Science 49.21 (2014): 7462-7475.*
Machine English translation of RU2343235.*
International Search Report dated Oct. 7, 2014, mailed Oct. 28, 2014.
English Translation of International Search Report dated Oct. 7, 2014, mailed Oct. 28, 2014.
European Search Report for corresponding European Application No. 14829940.7, dated Mar. 1, 2017.
A Communication issued by the European Patent Office for corresponding European Application No. 14829940.7, dated Feb. 15, 2017.

* cited by examiner

PYROLYSIS GAS IS PRODUCED

PYROLYSIS GAS IS PRODUCED

CARBONIZATION METHOD AND CARBON FIBER PRODUCTION METHOD

This application is a 371 application of PCT/JP2014/069552 filed Jul. 24, 2014, which claims priority to the Japanese application 2013-155364 filed Jul. 26, 2013.

TECHNICAL FIELD

The present invention relates to a precursor fiber carbonization method and a carbon fiber production method.

BACKGROUND ART

Carbon fibers are produced by heating (carbonizing) precursor fibers made from, for example, polyacrylonitrile fibers, rayon fibers, cellulose fibers, or pitch fibers. For example, precursor fibers made from polyacrylonitrile fibers are heated (carbonized) through an oxidization process of heating the fibers in an atmosphere containing oxygen (inside an oxidization furnace), and a carbonization process of heating the fibers that have undergone the oxidization process (hereinafter, "oxidized fibers") in an inert atmosphere (inside a carbonization furnace). Such heating (carbonization) is performed as the fibers pass (or are conveyed) through the oxidization furnace and the carbonization furnace.

To enhance the mechanical properties of fibers, appropriate tension is to be applied to the fibers during the carbonization process. In view of this, one technique uses two (or more) furnaces of different temperatures arranged in order of increasing temperatures, through which oxidized fibers pass in the carbonization process (e.g., Patent Literature 1).

Heating in the carbonization process is performed using an electric heater or the like. That is, the atmosphere inside a furnace is heated by an electric heater or the like, and oxidized fibers are indirectly heated as they pass through the inside of the heated furnace. In this case, the inside of the furnace is heated entirely, and thus the heating efficiency of the oxidized fibers is low (low heating efficiency). In addition, the heat inside the furnace is gradually conducted from an outer portion to an inner portion of the oxidized fibers (strand), and thus their carbonization takes time (prolonged carbonization).

Methods have been developed in response to such low heating efficiency and prolonged carbonization caused by the use of the electric heater or the like. One method includes directly heating oxidized fibers.

Such direct heating methods include a method using microwaves (e.g., Patent Literature 2 and Patent Literature 3), a method using plasma (e.g., Patent Literature 4), a method using both microwaves and plasma (e.g., Patent Literature 5), and a method using high-frequency electromagnetic waves (e.g., Patent Literature 6).

CITATION LIST

Patent Literature

Patent Literature 1: Japanese Patent No. 4838595
Patent Literature 2: Japanese Patent No. 1483314
Patent Literature 3: Japanese Patent No. 1401146
Patent Literature 4: U.S. Pat. No. 6,372,192
Patent Literature 5: U.S. Pat. No. 8,679,592
Patent Literature 6: Japanese Patent No. 5191004

SUMMARY OF INVENTION

Technical Problems

Unfortunately, the techniques of Patent Literature 2 to Patent Literature 4 heat oxidized fibers of a predetermined length placed in a container or the like. These techniques are not applicable to oxidized fibers that are conveyed inside a furnace.

The technique of Patent Literature 5 uses microwaves and plasma simultaneously generated inside one waveguide, thereby making it difficult to apply appropriate tension to oxidized fibers inside the waveguide in accordance with the state of the fibers. The technique of Patent Literature 6 uses high-frequency electromagnetic waves that couple directly to fibers, as in coaxial cables, and thus may disable reliable treatment after a discharge in a treatment zone.

One or more aspects of the present invention are directed to a carbonization method and a carbon fiber production method that enable appropriate tension to be applied to fibers during a carbonization process in accordance with the state of the fibers, while achieving high heating efficiency and reducing the time taken for carbonization.

Solution to Problems

A carbonization method according to a first aspect of the present invention is a carbonization method of carbonizing precursor fibers that are being conveyed. With this method, carbonization is performed using a plurality of carbonization furnaces for heating fibers, the plurality of carbonization furnaces being arranged in a direction in which the fibers are conveyed. The plurality of carbonization furnaces include at least one carbonization furnace that heats the fibers using plasma when the fibers are passing through an inside of the at least one carbonization furnace.

A carbon fiber production method according to a second aspect of the present invention is a carbon fiber production method including a carbonization process of carbonizing precursor fibers that are being conveyed. With the carbon fiber production method, the carbonization process is performed with the carbonization method according to the first aspect of the present invention.

Advantageous Effects of Invention

The carbonization method and the carbon fiber production method according to one or more aspects of the present invention include heating fibers passing through the inside of at least one carbonization furnace using plasma. The fibers can be heated with high heating efficiency. Furthermore, the plurality of carbonization furnaces enable appropriate tension to be applied to the fibers inside each carbonization furnace.

BRIEF DESCRIPTION OF DRAWINGS

FIG. 2A shows a first carbonization furnace. FIG. 2B shows the distribution of intensity of microwaves with which oxidized fibers are irradiated while passing through the inside of the first carbonization furnace. FIG. 2C is a schematic diagram showing an electric field strength adjustment mechanism inside the first carbonization furnace. FIG. 2D shows the ratio of opening areas of slits in the electric field strength adjustment mechanism.

FIG. 4A shows the first carbonization furnace. FIG. 4B shows the distribution of intensity of microwaves with which oxidized fibers are irradiated while passing through the inside of the first carbonization furnace.

FIG. 5A shows a first carbonization furnace. FIG. 5B shows the distribution of intensity of microwaves with which oxidized fibers are irradiated while passing through the inside of the first carbonization furnace. FIG. 5C is a schematic diagram showing an electric field strength adjustment mechanism inside the first carbonization furnace.

DESCRIPTION OF EMBODIMENTS

Outline

Figure 1:
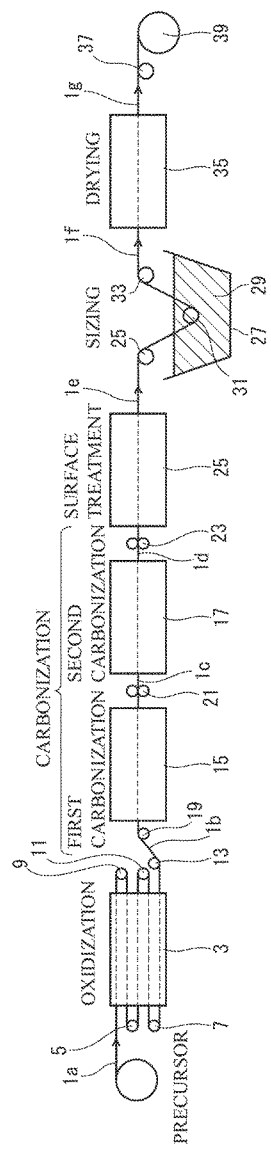
FIG. 1 is a schematic diagram showing carbon fiber production processes.

A carbonization process according to an aspect of the present invention is included in a carbonization method of carbonizing precursor fibers that are being conveyed. The carbonization process is performed using a plurality of carbonization furnaces for heating fibers, the plurality of carbonization furnaces being arranged in a direction in which the fibers are convened. The plurality of carbonization furnaces include at least one carbonization furnace that heats the fibers using plasma when the fibers are passing through the inside of the at least one carbonization furnace.

The foregoing "plurality of carbonization furnaces" are provided in a form independent of each other. The "independent form" means a form in which tension applied to the fibers can be adjusted separately in each of carbonization furnaces adjacent in the direction of conveyance of the fibers. When one carbonization furnace is provided, the inside of the carbonization furnace may be divided into a plurality of regions arranged in the direction of conveyance of the fibers to allow tension applied to the fibers to be adjusted separately in each of adjacent regions. In this case, the inner regions are equivalent to a plurality of carbonization furnaces.

The "precursor fibers" include fibers that have been oxidized and fibers that have not been oxidized. In view of productivity, the "precursor fibers" may be oxidized fibers.

The "fibers" include the precursor fibers and fibers that have passed through the inside of one or more carbonization furnaces. That is, in the carbonization process of carbonizing the precursor fibers, a plurality of carbonization furnaces are provided for the precursor fibers to pass through (these precursor fibers include fibers that have passed through one or more carbonization furnaces). Fibers that enter a first carbonization furnace that is located first from the upstream side of the direction of conveyance of the precursor fibers among the plurality of carbonization furnaces are the precursor fibers. Fibers that have passed through the inside of the first carbonization furnace enter a second carbonization furnace that is located second from the upstream side among the plurality of carbonization furnaces. Fibers that have passed through the inside of the second carbonization furnace enter a third carbonization furnace that is located third from the upstream side among the plurality of carbonization furnaces.

The at least one carbonization furnace heats the fibers by generating plasma and passing the fibers through the generated plasma. Alternatively, the at least one carbonization furnace heats the fibers by generating plasma and irradiating the fibers with the generated plasma. Consequently, the fibers can be heated efficiently.

The at least one carbonization furnace is located second or later from the upstream side of the direction of conveyance of the fibers among the plurality of carbonization furnaces. Thus, although the fibers may increase in conductivity as their carbonization proceeds while passing through the inside of the carbonization furnace located second or later, a discharge is less likely to occur in the fibers. Note that once a discharge occurs, the fibers easily break.

A carbonization furnace that is located first from the upstream side of the direction of conveyance of the fibers among the plurality of carbonization furnaces heats the fibers using microwaves and/or plasma. Thus, the fibers can be heated efficiently while passing through the inside of the carbonization furnace that is located first.

The carbonization furnace that is located first includes a first stage and a second stage. The first stage heats the fibers by applying constant or increasing energy to be converted into heat to the fibers. The second stage heats the fibers after the first stage by applying energy to be converted into heat to the fibers. The energy applied in the second stage is lower than the energy applied at an end of the first stage. The first stage ends before an amount of gas produced from the fibers by heating reaches its peak. Thus, while passing through the inside of the carbonization furnace that is located first, the fibers are exposed to energy to be converted into heat necessary for the pyrolysis of the fibers.

The second stage heats the fibers by applying the energy to be converted into heat to the fibers while gradually reducing the energy to allow a reaction of the fibers to progress mildly. The expression "gradually reducing" includes linear reduction, reduction with a curved profile, and stepwise reduction. The degree of reduction is to be greater than the degree of reduction that causes the fibers to break due to heat accumulation. In other words, the energy is to be reduced such that the amount of heat accumulation in the fibers does not cause breakage of the fibers. Thus, the fibers can be prevented from breaking due to heat accumulation while passing through the inside of the carbonization furnace that is located first.

The fibers that have completed the first stage have a density of not more than 1.60 g/cm$^3$. Thus, carbonization can be performed in a reliable manner.

The fibers that have passed through the carbonization furnace that is located first have a density of not less than 1.50 g/cm$^3$. Thus, carbonization can progress further in the carbonization furnace located second or later.

Although the above carbonization method is described using the carbonization furnaces, the carbonization method may be a method using carbonization of fibers inside furnaces as described below.

The carbonization method includes a plurality of carbonization processes of heating fibers passing through the inside of a carbonization furnace. The plurality of carbonization processes include at least one carbonization process of heating the fibers using plasma.

The at least one carbonization process heats the fibers by generating plasma and passing the fibers through the generated plasma. Alternatively, the at least one carbonization process heats the fibers by generating plasma and irradiating the fibers with the generated plasma.

The at least one carbonization process is performed second or later from the upstream side of the direction of conveyance of the fibers among the plurality of carbonization processes. In a carbonization process that is performed upstream relative to the at least one carbonization process, the fibers are heated using microwaves and/or plasma.

A carbonization process that is performed first from the upstream side of the direction of conveyance of the fibers among the plurality of carbonization processes includes a first stage and a second stage. The first stage heats the fibers by applying constant or increasing energy to be converted into heat to the fibers when the fibers are passing through the inside of the carbonization furnace. The second stage heats the fibers after the first stage by applying energy to be converted into heat to the fibers. The energy applied in the second stage is lower than the energy applied at an end of the first stage. The first stage ends before an amount of gas produced from the fibers by heating reaches its peak.

The second stage heats the fibers by applying the energy to be converted into heat to the fibers while gradually reducing the energy to allow a reaction of the fibers to progress mildly. The expression "gradually reducing" means the same as described earlier.

The fibers that have completed the first stage have a density of not more than 1.60 g/cm$^3$. The fibers that have passed through the carbonization process that is performed first have a density of not less than 1.50 g/cm$^3$.

A carbon fiber production method according to an aspect of the present invention includes a carbonization process of carbonizing precursor fibers that are being conveyed. With the carbon fiber production method, the carbonization process is performed with the above carbonization method. Thus, carbon fibers can be produced efficiently.

Embodiments

A carbonization method, as well as a carbon fiber production method that incorporates the carbonization method, will now be described using an example case in which precursor fibers are acrylonitrile fibers.

A carbonization method and a carbon fiber production method according to one or more embodiments of the present invention are used to carbonize precursor fibers through a plurality of carbonization furnaces, at least one of which uses plasma. Embodiments 1 to 11 below are possible.

Working examples of the carbonization method and the carbon fiber production method according to Embodiments 1 to 11 are shown in Tables 1 and 2. The numerical values of each working example shown in the tables are not intended to limit the carbonization method and the carbon fiber production method according to the corresponding embodiment. Note that the numbers appended to the working examples shown correspond to the numbers of the embodiments. That is, "Working Ex. 1" in the tables is a working example of Embodiment 1.

Tables 1 and 2 also show a comparative example that uses a conventional electric heater. Residence time inside the furnaces is shorter in any of Working Examples 1 to 11 than in the comparative example.

Note that a carbonization furnace that is located n$^{th}$ from the upstream side of the direction of conveyance of fibers among the plurality of carbonization furnaces is referred to as the "n$^{th}$ carbonization furnace," and a carbonization process performed in the n$^{th}$ carbonization furnace is referred to as the "n$^{th}$ carbonization process," where "n" is a natural number greater than or equal to two.

Embodiment 1

In Embodiment 1, two carbonization furnaces are arranged to heat fibers. Among the two carbonization furnaces, a carbonization furnace that is located first and a carbonization furnace that is located second from the upstream side of the direction of conveyance of fibers are referred to as the "first carbonization furnace" and the "second carbonization furnace," respectively. Plasma-assisted heating is performed in the second carbonization furnace.

Heating means of the first carbonization furnace uses microwaves, although no particular limitation is intended. Precursor fibers that enter the first carbonization furnace are oxidized fibers, i.e., fibers that have been oxidized. The foregoing oxidized fibers have, for example, a density of 1.30 to 1.45 g/cm$^3$.

1. Carbon Fiber Production Processes

FIG. 1 is a schematic diagram showing carbon fiber production processes.

Carbon fibers are produced using precursor fibers, or a precursor. One precursor is a strand (bundle) of a plurality of, e.g., 12,000 filaments. It may also be referred to as a precursor strand or a carbon strand.

A precursor 1a is prepared as follows. First, a spinning solution obtained by polymerization of monomers containing 90% or more by mass of acrylonitrile is spun into fibers using a wet spinning method or a dry-wet spinning method. Then, the fibers are washed, dried, and stretched. The resultant fibers serve as the precursor 1a. Note that monomers to be copolymerized are selected from among, for example, alkyl acrylate, alkyl methacrylate, acrylic acid, acrylamide, itaconic acid, and maleic acid.

The speed of production of the precursor 1a normally differs from the speed of production of carbon fibers through carbonization of the precursor 1a. For this reason, the produced precursor 1a is stored in a container or wound onto a bobbin.

As shown in FIG. 1, the precursor 1a is, for example, pulled from the bobbin and conveyed downstream. Along the way, the precursor 1a undergoes various treatments, and is then wound, as carbon fibers, onto a bobbin 39.

As shown in FIG. 1, the carbon fibers are produced through the following processes: an oxidization process of oxidizing the precursor 1a, carbonization processes of carbonizing the fibers that have been oxidized (hereinafter, "oxidized fibers") 1b in a stretched state, a surface treatment process of improving the surface of fibers that have been carbonized (hereinafter, "carbonized fibers" as appropriate) 1d, a sizing process of coating surface-improved fibers 1e with resin, and a drying process of drying resin-coated fibers 1f.

Dried fibers 1g are wound, as carbon fibers 1g, onto the bobbin 39. Although fibers resulting from different processes are differentiated with letters (e.g., oxidized fibers 1b), they are simply given reference numeral 1 when such differentiation is not used.

Treatment for oxidizing the precursor 1a is referred to as oxidization treatment. Treatment for carbonizing the oxidized fibers 1b is referred to as carbonization treatment. Treatment for improving the surface of the carbonized fibers 1d is referred to as surface treatment. Treatment for coating the surface-improved fibers 1e with resin is referred to as sizing treatment. Treatment for drying the resin-coated fibers 1f is referred to as drying treatment. The treatments and processes will now be described.

(1) Oxidization Process (Oxidization Treatment)

The oxidization process is performed using an oxidization furnace 3, the inside of which is set to an oxidizing atmosphere of 200 to 350° C. Specifically, oxidization is performed by passing the precursor 1a, once or multiple times, through an air atmosphere inside the oxidization furnace 3. Note that the oxidizing atmosphere may contain, for example, oxygen and nitrogen dioxide.

The precursor 1a undergoing the oxidization process is stretched under predetermined tension suited for intended carbon fibers. In the oxidization process, the stretch ratio is, for example, in the range of 0.7 to 1.3. The precursor 1a is stretched using a plurality of rollers, e.g., two rollers 5 and 7 provided at the entrance of the oxidization furnace 3, and three rollers 9, 11, and 13 provided at the exit of the oxidization furnace 3.

(2) Carbonization Processes (Carbonization Treatment)

The carbonization processes perform carbonization by inducing pyrolysis by heating the oxidized fibers 1b. Carbonization is performed by passing the oxidized fibers 1b through a first carbonization furnace 15, and by further passing the resultant fibers 1c, which have passed through the first carbonization furnace 15, through a second carbonization furnace 17. That is, carbonization is performed by passing the fibers through at least two carbonization furnaces 15 and 17.

Carbonization performed in the first carbonization furnace 15 is referred to as "first carbonization" or "first carbonization treatment." The fibers 1c that have completed the first carbonization treatment (exited the first carbonization furnace 15) are referred to as "fibers that have undergone the first carbonization treatment".

Similarly, carbonization performed in the second carbonization furnace 17 is referred to as "second carbonization" or "second carbonization treatment". The fibers 1d that have completed the second carbonization treatment (exited the second carbonization furnace 17) are referred to as "fibers that have undergone the second carbonization treatment" or "carbonized fibers."

The plurality of carbonization furnaces are provided in a form independent of each other. The first carbonization furnace 15 and the second carbonization furnace 17 are provided independently of each other, and adjustment means for adjusting the tension of the fibers can be provided for the first carbonization furnace 15 and for the second carbonization furnace 17.

A roller 19 is provided outside the first carbonization furnace 15 at its entrance. A roller 21 is provided between the first carbonization furnace 15 and the second carbonization furnace 17. Rollers 23 are provided outside the second carbonization furnace 17 at its exit. The carbonization processes will be described later in detail.

(3) Surface Treatment Process (Surface Treatment)

The surface treatment process is performed by passing the carbonized fibers 1d through the inside of a surface treatment apparatus 25. A roller 25 is provided outside the surface treatment apparatus 25 at its exit. When the carbon fibers 1g are used in forming composite materials, the surface treatment provides the carbon fibers 1g and a resin matrix with improved affinity for and adhesion to each other.

The surface treatment is typically performed by oxidizing the surface of the carbon fibers 1d. The surface treatment may be, for example, liquid-phase or gas-phase treatment.

Industrial liquid-phase treatment involves, for example, chemical oxidation in which the carbon fibers 1d are immersed in an oxidizing agent, and electrolytic anodic oxidation in which electric current is passed through an electrolytic solution with the carbon fibers 1d immersed therein. Gas-phase treatment can be performed by passing the carbon fibers 1d through an oxidizing gas, or by spraying active species generated by, for example, a discharge.

(4) Sizing Process (Sizing Treatment)

The sizing process is performed by passing the fibers 1e through liquid resin 29 contained in a resin bath 27. Note that the sizing process improves the cohesion of the surface-treated fibers 1e.

The fibers 1e undergoing the sizing process pass through the liquid resin 29, with the direction of its conveyance being changed by, for example, a plurality of rollers 31 and 33 provided inside and around the resin bath 27. The liquid resin 29 is, for example, either a solution made by dissolving, in a solvent, at least one selected from the group including epoxy resin, urethane resin, phenolic resin, vinyl ester resin, and unsaturated polyester resin, or an emulsion.

(5) Drying Process (Drying Treatment)

The drying process is performed by passing the fibers 1f through the inside of a drying furnace 35. Note that the dried fibers 1g are wound onto the bobbin 39 via a roller 37 that is provided outside and downstream relative to the drying furnace 35 (a winding process).

2. Carbonization Processes

The carbonization processes include a first carbonization process and a second carbonization process. In the first carbonization process, pyrolysis is induced by rapid and uniform heating of the oxidized fibers 1b using microwaves inside the first carbonization furnace 15. In the second carbonization process, carbonization of fibers progresses through rapid and uniform heating of the microwave-heated fibers 1c in a stretched state using plasma inside the second carbonization furnace 17.

Note that the foregoing "rapid and uniform heating" refers to heating with a temperature increase rate of 500° C./min or higher and a temperature difference of 25° C. or less between the surface and the center of the fibers.

(1) First Carbonization Process

The first carbonization process induces pyrolysis by heating, and aligns the crystalline orientations by stretching the oxidized fibers 1b, thereby forming a structure that allows for easy carbonization.

While the oxidized fibers 1b are conveyed in an inert gas atmosphere inside the first carbonization furnace 15, the first carbonization process provides the oxidized fibers 1b with energy to be converted into heat in such a manner that the heat attenuates along the way. Note that nitrogen, argon, or the like is used as an inert gas.

The first carbonization furnace 15 includes heating means that uses microwaves, which can change the intensity of microwaves applied to the oxidized fibers 1b. In one example, the first carbonization furnace 15 includes a first furnace body, a magnetron, and an electric field strength adjustment mechanism. The magnetron is an oscillator that generates microwaves inside the first furnace body. The electric field strength adjustment mechanism adjusts the electric field strength of microwaves applied into a region where the oxidized fibers 1b are conveyed inside the first furnace body.

FIGS. 2A to 2D are conceptual diagrams showing the first carbonization furnace.

Figure 2A:
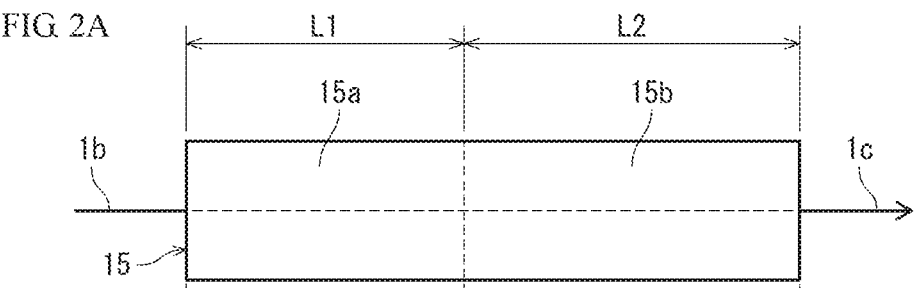
FIGS. 2A to 2D are conceptual diagrams showing a heated state in a first carbonization process.
Figure 2B:
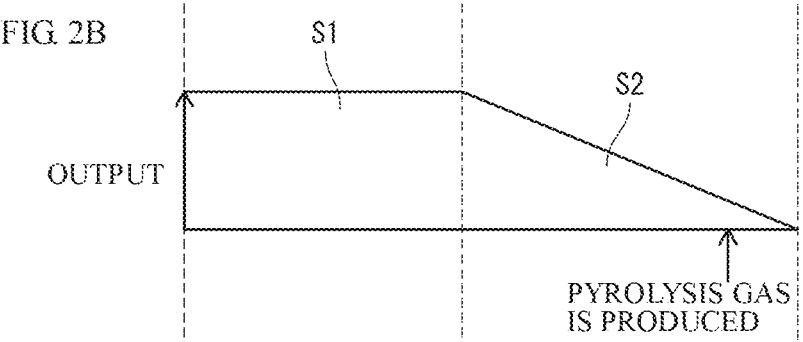
Figure 2C:
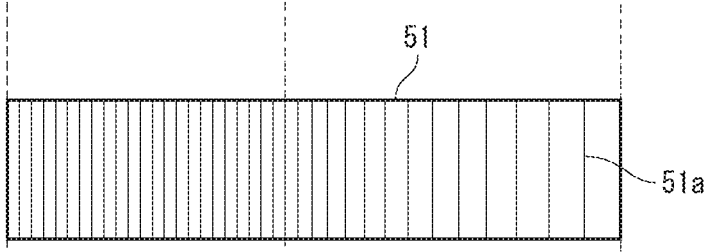

FIG. 2A shows the first carbonization furnace. FIG. 2B shows the distribution of intensity of microwaves with which the oxidized fibers are irradiated while passing through the inside of the first carbonization furnace. FIG. 2C is a schematic diagram showing the electric field strength adjustment mechanism inside the first carbonization furnace.

Figure 2D:
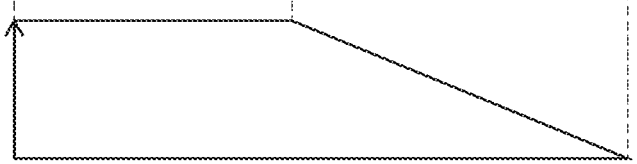

FIG. 2D shows the opening areas of slits in the electric field strength adjustment mechanism.

The horizontal axes in FIGS. 2B to 2D indicate the length of the first carbonization furnace 15 in the direction of conveyance of the oxidized fibers 1b.

As shown in FIG. 2A, the first carbonization furnace 15 has a first region 15a and a second region 15b inside, which are respectively located at the entrance side and the exit side of the first carbonization furnace 15 along the region where the oxidized fibers 1b are conveyed. The first region 15a has a length L1 and the second region 15b has a length L2 in the direction of conveyance of the oxidized fibers 1b.

Note that the electric field strength adjustment mechanism 51 also has a first region corresponding to the first region 15a of the first carbonization furnace 15 and a second region corresponding to the second region 15b of the first carbonization furnace 15.

The electric field strength adjustment mechanism 51 is made of a material that blocks transmission of microwaves. As shown in FIG. 2C, the electric field strength adjustment mechanism 51 has slits 51a on its peripheral wall to permit microwaves to pass through. The electric field strength of microwaves applied to the oxidized fibers 1b is adjusted by the density (quantity) of the slits Ma.

A plurality of slits Ma in the first region 15a are arranged at equal intervals in the direction of conveyance. A plurality of slits Ma in the second region 15b are arranged in such a manner that intervals therebetween increase as a distance to the exit of the first carbonization furnace 15 decreases in the direction of conveyance. Energy to be converted into heat increases or decreases in accordance with an increase or decrease in the electric field strength.

The slits 51a are arranged at larger intervals in the second region 15b than in the first region 15a. That is, the amount of microwaves with which the oxidized fibers 1b are irradiated is larger in the first region 15a than in the second region 15b.

As shown in FIG. 2D, the opening areas of the slits 51a in the electric field strength adjustment mechanism 51 are constant in the first region 15a anywhere in the direction of conveyance of the oxidized fibers 1b, and decrease in the second region 15b as a distance to the exit of the first carbonization furnace 15 decreases.

The first carbonization furnace 15 thus configured irradiates the oxidized fibers 1b conveyed inside the first carbonization furnace 15 with microwaves having the intensity distribution shown in FIG. 2B. That is, in the first carbonization process, microwaves S1 of a constant intensity are applied in the first region 15a located at the entrance side, and then microwaves S2 are applied in the second region 15b in such a manner that the intensity gradually decreases as a distance to the exit of the first carbonization furnace 15 decreases.

Due to such microwave irradiation in the first region 15a and the second region 15b, the regions 15a and 15b represent a first stage and a second stage, respectively. The first stage heats the oxidized fibers 1b by applying constant energy to be converted into heat to the oxidized fibers 1b. The second stage heats the oxidized fibers 1b by applying energy to be converted into heat to the oxidized fibers 1b. The energy applied in the second stage is lower than the energy applied at the end of the first stage.

The border between the first region 15a and the second region 15b is determined based on the degree of progress of the pyrolysis of the microwave-heated oxidized fibers 1b.

That is, the first stage ends before the amount of pyrolysis gas produced from the oxidized fibers 1b by pyrolysis reaches its peak.

The foregoing expression "before reaching its peak" may be the state where the amount of pyrolysis gas produced is at least 10% of the peak and less than 100% of the peak. The carbonization efficiency increases as the amount approaches 100% of the peak.

The second stage heats the oxidized fibers 1b by applying the energy to be converted into heat to the oxidized fibers 1b while gradually reducing the energy to allow the reaction of the oxidized fibers 1b to progress mildly. In the second stage, the intensity of microwaves is gradually reduced to prevent the oxidized fibers 1b from breaking due to heat accumulation in the oxidized fibers 1b caused by heating the oxidized fibers 1b.

In other words, the first stage provides energy to be converted into heat necessary for the pyrolysis of the oxidized fibers 1b, whereas the second stage provides energy to be converted into heat necessary for carbonization without making the oxidized fibers 1b break due to accumulation of heat.

Examples of the pyrolysis gas include an organic compound, ammonia ($NH_3$), and hydrogen cyanide (HCN) produced by the pyrolysis of polyacrylonitrile. The oxidized fibers 1b at a temperature of 350 to 500° C. produce the largest amount of pyrolysis gas. At such temperatures leading to the peak amount of pyrolysis gas, the oxidized fibers 1b have a density of approximately 1.5 g/cm$^3$.

In other words, the first stage is a process of irradiating the oxidized fibers 1b with microwaves until the oxidized fibers 1b reach a density of 1.40 to 1.50 g/cm$^3$.

The first carbonization process provides energy to be converted into heat, in such a manner that the total amount of energy does not cause a drastic progress of carbonization through application and generation of heat. Specifically, the amount of such energy to be converted into heat allows a mild progress of carbonization without generating heat after a large amount of pyrolysis gas is produced by pyrolysis (this amount of energy is provided in multiple, e.g., two divided stages).

Using the density of the oxidized fibers 1b, the amount of thermal energy during the first carbonization process allows the oxidized fibers 1b to have a density in the range of 1.50 to 1.60 g/cm$^3$. Thus, the oxidized fibers 1b can undergo the first carbonization treatment in a reliable manner.

Energy to be converted into necessary heat is determined by conducting, in advance, an experiment associated with the peak amount of produced pyrolysis gas and the density and temperature of the oxidized fibers 1b. The time period of microwave irradiation in the first stage is then determined based on the relationship between the determined energy and the intensity of microwaves.

In the first carbonization process, a tension range of the oxidized fibers 1b is set so as to prevent breakage of the oxidized fibers 1b in a heated state. The oxidized fibers 1b in a heated state easily break as they have undergone a structural change. Conducting an experiment in advance yields a tension range that does not cause such breakage.

Tension may be applied to the oxidized fibers 1b with a stretch ratio in the range of 0.9 to 1.1, although there are fluctuations depending on, for example, the speed of pyrolysis and the range over which pyrolysis occurs.

(2) Second Carbonization Process

In the second carbonization process, the fibers 1c that have passed through the first carbonization furnace 15, i.e., the fibers 1c that have undergone the first carbonization treatment, are rapidly and uniformly heated in an inert gas atmosphere inside the second carbonization furnace 17, under tension different from the tension applied inside the first carbonization furnace 15. Note that nitrogen, argon, or the like is used as an inert gas. The tension different from the tension applied inside the first carbonization furnace 15 refers to, for example, tension higher than the tension applied inside the first carbonization furnace 15. Specifically, tension applied in the second carbonization process is 1.0 to 5.0 times the tension applied in the first carbonization process.

In the second carbonization process, carbonization of the fibers $1c$ that have undergone the first carbonization treatment further progresses. In other words, the second carbonization process rapidly and uniformly heats the fibers $1c$ that have undergone the first carbonization treatment until a fiber density of 1.70 to 1.90 g/cm$^3$ is reached.

Heating means uses, for example, plasma. In one specific example, the heating means heats the fibers $1c$ that have undergone the first carbonization treatment using plasma that is generated inside the second carbonization furnace 17 by repeatedly forming an arc discharge between a pair of upper and lower electrodes. These electrodes are arranged such that a region where the fibers $1c$ are conveyed is interposed between them.

The fibers $1c$ that have undergone the first carbonization treatment are heated by passing through the plasma. In the course of heating, the density of the generated plasma is adjusted so that the structure of the fibers $1d$ that have undergone the second carbonization treatment has physical properties equivalent to physical properties of fibers treated by known atmospheric heating (e.g., heating with an electric heater). Note that the known atmospheric heating is heating in a temperature range equivalent to 900 to 2,500° C.

To align the orientations of fused aromatic rings, the oxidized fibers $1b$ are stretched under tension appropriate for the state of the oxidized fibers $1b$ (including the fibers $1c$ that have undergone the first carbonization treatment) in the carbonization processes. As the first carbonization furnace 15 and the second carbonization furnace 17 are discretely provided in a form independent of each other, the carbonization process of Embodiment 1 can apply, to the carbonization fibers $1b$ and $1c$ inside the discrete carbonization furnaces 15 and 17, tension suited for the state of the fibers $1b$ and $1c$.

Particularly, a nip roller 21 is provided between the first carbonization furnace 15 and the second carbonization furnace 17. The nip roller 21 includes a pair of upper and lower rollers that hold the fibers $1c$ that have undergone the first carbonization treatment. Thus, when the fibers $1c$ that have undergone the first carbonization treatment are stretched inside the second carbonization furnace 17 using the rollers 23, which are provided outside the second carbonization furnace 17 at its exit, the resulting tension is not applied to the oxidized fibers $1b$ inside the first carbonization furnace 15.

Working Examples

A working example of Embodiment 1 will now be described.

Specifically, the following describes carbonization processes of producing carbonized fibers $1d$ having a density of 1.77 g/cm$^3$ by carbonizing oxidized fibers $1b$ having a density of 1.36 g/cm$^3$.

(1) First Carbonization Process

The first carbonization furnace 15 uses microwaves with a wavelength in the range of 0.705 to 0.00737 m, and with a frequency in the range of 425 to 40,680 MHz. For example, the first carbonization furnace 15 uses a magnetron-type oscillator device.

The length L1 shown in FIG. 2B is in the range of 0.1 to 10 m, and the length L2 in the figure is in the range of 0.2 to 10 m. A microwave output is in the range of 0.1 to 1,000 kW.

The speed of conveyance of the oxidized fibers $1b$ is in the range of 0.1 to 50 m/min. A tension applied to the oxidized fibers $1b$ is in the range of 0.1 to 5 mN/dtex.

The inside of the first carbonization furnace 15 is maintained in a nitrogen atmosphere at 91,000 to 122,000 Pa. The first carbonization process carbonizes the oxidized fibers $1b$ until they have a density of, for example, 1.50 to 1.60 g/cm$^3$.

(2) Second Carbonization Process

Plasma used in the second carbonization furnace 17 is, for example, microwave plasma. A magnetron-type oscillator device generates microwaves inside the second carbonization furnace 17 and excites nitrogen inside the furnace to fill the inside of the furnace with plasma.

The inside of the second carbonization furnace 17 is maintained in a nitrogen atmosphere at 100 to 122,000 Pa. The speed of conveyance of the fibers $1c$ that have undergone the first carbonization treatment is in the range of 0.08 to 55 m/min. A tension in the range of 0.2 to 5 mN/dtex is applied to the fibers $1c$ that have undergone the first carbonization treatment. Plasma is generated with a microwave output in the range of 0.1 to 1,000 kW.

Embodiment 2

A working example of Embodiment 2 will now be described.

In Embodiment 1, the fibers $1c$ that have undergone the first carbonization treatment pass through a plasma atmosphere in the second carbonization process. Embodiment 2 describes an example in which fibers $1c$ that have undergone first carbonization treatment are irradiated with plasma in a second carbonization process.

A carbon fiber production method according to Embodiment 2 includes an oxidization process, carbonization processes, a surface treatment process, a sizing process, and a drying process. The oxidization process, the first carbonization process, the surface treatment process, the sizing process, and the drying process according to Embodiment 2 are the same as those described in Embodiment 1. Thus, the following describes the second carbonization process according to Embodiment 2.

The carbonization processes according to Embodiment 2 include a twisting process of twisting the fibers $1c$ that have passed through a first carbonization furnace 15, i.e., the fibers $1c$ that have undergone the first carbonization treatment, so that the front side (upper side) and the back side (lower side) of the fibers $1c$ are reversed. That is, the carbonization processes include the twisting process between the first carbonization process and the second carbonization process. As will be described later, the purpose of the twisting process is to reduce variations in filaments.

Figure 3:
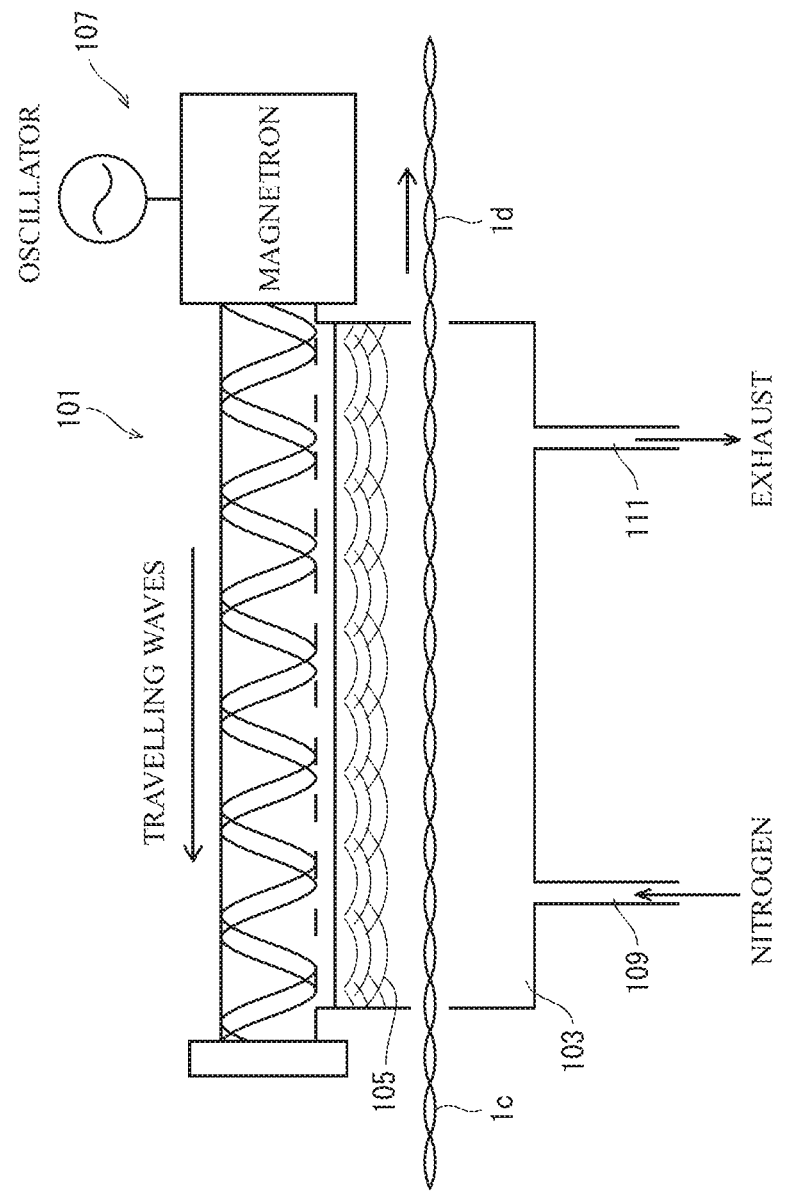
FIG. 3 is a schematic diagram showing a second carbonization furnace according to Embodiment 2.

FIG. 3 is a schematic diagram showing a second carbonization furnace according to Embodiment 2.

A second carbonization furnace 101 includes a furnace body 103, a plasma irradiation apparatus 107, an intake tube 109, and an exhaust tube 111. The fibers $1c$ that have undergone the first carbonization treatment pass through the furnace body 103. The plasma irradiation apparatus 107 enables irradiation with plasma 105 from an upper portion to an inner portion of the furnace body 103. The intake tube 109 and the exhaust tube 111 are used to generate an inert atmosphere inside the furnace body 103, using nitrogen as an inert gas.

The plasma irradiation apparatus 107 generates surface-wave plasma using a slot antenna method. Thus, while passing through the inside of the second carbonization furnace 101, the fibers 1c that have undergone the first carbonization treatment are irradiated with the plasma only at their upper side.

The inventor has conducted a research on a dual-side irradiation technique with which the fibers 1c that have undergone the first carbonization treatment are irradiated with the plasma at their front side and back side inside the second carbonization furnace using the plasma irradiation apparatus 107 provided at an upper portion and a lower portion of the furnace body 103. The inventor has also conducted a research on a single-side irradiation technique with which the fibers 1c that have undergone the first carbonization treatment are irradiated with the plasma at their upper side inside the second carbonization furnace 101 using the plasma irradiation apparatus 107 provided at one of the upper portion and the lower portion of the furnace body 103 as shown in FIG. 3, or specifically the upper portion of the furnace body 103 in the present example.

The research on the single-side irradiation technique conducted by the inventor has proven that the filaments constituting the carbonized fibers 1d have larger variations when the upper side of the fibers 1c that have undergone the first carbonization treatment is heated inside the second carbonization furnace 101. Note that the variations in filaments are variations in the filament lengths.

These filaments are in the form of a strand. During conveyance inside the second carbonization furnace 101, filaments in the fibers (strand) 1c that have undergone the first carbonization treatment have higher temperature near the upper side of the fibers (strand) 1c than near the lower side of the fibers (strand) 1c. Variations in the filament lengths are presumably attributed to the difference between the degrees of carbonization in an upper portion and a lower portion of the fibers (strand) 1c that have undergone the first carbonization treatment.

As stated earlier, the carbonization processes according to Embodiment 2 include the twisting process. Thus, when the fibers 1c that have undergone the first carbonization treatment are being conveyed inside the second carbonization furnace 101, their front side and back side are reversed. This reduces a temperature difference between the upper side and lower side of the fibers 1c that have undergone the first carbonization treatment inside the second carbonization furnace 101, and reduces variations in thermal contraction of the filaments.

The number of twists is set such that the front side and the back side of the fibers 1c are irradiated with plasma the same number of times by reversing the front and the back when the fibers 1c that have undergone the first carbonization treatment are passing through the inside of the second carbonization furnace 101. That is, the upper side and the lower side of the fibers 1c are each irradiated with plasma the same number of times (for the same duration).

Considering that the fibers 1c that have undergone the first carbonization treatment undergo an initial temperature rise upon entering the second carbonization furnace 101, the number of reversals may be ten per meter, i.e., the number of twists may be five per meter. Note that the foregoing number of twists is the number of turns of the fibers (strand) per meter.

For example, a false twisting machine can be used as a twisting apparatus.

Embodiment 3

A working example of Embodiment 3 will now be described.

In Embodiment 3, two carbonization furnaces are provided to heat fibers using plasma. Note that in Embodiments 3 to 11, plasma-assisted heating may be performed by conveying fibers through a plasma atmosphere as in Embodiment 1, or by irradiating fibers that are being conveyed with plasma as in Embodiment 2.

The inside of a first carbonization furnace is maintained in a nitrogen atmosphere at 1 kPa. Plasma is generated with a microwave output of 1.0 kW. The residence time inside the furnace is 15 seconds, and oxidized fibers can be carbonized until they have a density of 1.55 g/cm$^3$.

When the first carbonization furnace uses plasma, the present embodiment can be implemented by, for example, adjusting the energy to be converted into plasma (heat) in the second carbonization furnace 17 of Embodiment 1. More specifically, the plasma generated in the second carbonization furnace 17 can be used after its density is adjusted (reduced).

The inside of a second carbonization furnace is maintained in a nitrogen atmosphere at 8 kPa. Plasma is generated with a microwave output of 3.0 kW. The residence time inside the furnace is 30 seconds, and the fibers can be carbonized until they have a density of 1.80 g/cm$^3$.

Note that the produced carbon fibers have a tensile strength of 3.5 GPa and a tensile modulus of 235 GPa.

Embodiment 4

A working example of Embodiment 4 will now be described.

In Embodiment 4, two carbonization furnaces are provided, of which the first carbonization furnace heats fibers using plasma and the second carbonization furnace heats fibers using an electric heater.

The inside of the first carbonization furnace is maintained in a nitrogen atmosphere at 1 kPa. Plasma is generated with a microwave output of 1.5 kW. The residence time inside the furnace is 30 seconds, and oxidized fibers can be carbonized until they have a density of 1.76 g/cm$^3$.

The inside of the second carbonization furnace is maintained in a nitrogen atmosphere at 100 kPa. The temperature inside the furnace is set at 1,400° C. by the electric heater. The residence time inside the furnace is 240 seconds, and the fibers can be carbonized until they have a density of 1.79 g/cm$^3$.

Note that the produced carbon fibers have a tensile strength of 5.0 GPa and a tensile modulus of 240 GPa.

Embodiment 5

A working example of Embodiment 5 will now be described.

In Embodiment 5, two carbonization furnaces are provided, of which the first carbonization furnace heats fibers using an electric heater and the second carbonization furnace heats fibers using plasma.

The inside of the first carbonization furnace is maintained in a nitrogen atmosphere at 100 kPa. The temperature inside the furnace is set at 600° C. by the electric heater. The residence time inside the furnace is 180 seconds, and the fibers can be carbonized until they have a density of 1.55 g/cm$^3$.

The inside of the second carbonization furnace is maintained in a nitrogen atmosphere at 4 kPa. Plasma is generated with a microwave output of 0.5 kW. The residence time inside the furnace is 50 seconds, and the fibers can be carbonized until they have a density of 1.77 g/cm³.

Note that the produced carbon fibers have a tensile strength of 4.0 GPa and a tensile modulus of 240 GPa.

Embodiment 6

A working example of Embodiment 6 will now be described.

In Embodiment 6, three carbonization furnaces are provided, of which a first carbonization furnace heats fibers using an electric heater, a second carbonization furnace heats fibers using plasma, and a third carbonization furnace heats fibers using an electric heater.

The inside of the first carbonization furnace is maintained in a nitrogen atmosphere at 100 kPa. The temperature inside the furnace is set at 600° C. by the electric heater. The residence time inside the furnace is 180 seconds, and the fibers can be carbonized until they have a density of 1.55 g/cm³.

The inside of the second carbonization furnace is maintained in a nitrogen atmosphere at 4 kPa. Plasma is generated with a microwave output of 0.5 kW. The residence time inside the furnace is 50 seconds, and the fibers can be carbonized until they have a density of 1.77 g/cm³.

The inside of the third carbonization furnace is maintained in a nitrogen atmosphere at 100 kPa. The temperature inside the furnace is set at 1,600° C. by the electric heater. The residence time inside the furnace is 300 seconds, and the fibers can be carbonized until they have a density of 1.80 g/cm³.

Note that the produced carbon fibers have a tensile strength of 4.2 GPa and a tensile modulus of 285 GPa.

Embodiment 7

A working example of Embodiment 7 will now be described.

In Embodiment 7, three carbonization furnaces are provided, of which the first carbonization furnace heats fibers using microwaves, the second carbonization furnace heats fibers using plasma, and the third carbonization furnace heats fibers using an electric heater.

The inside of the first carbonization furnace is maintained in a nitrogen atmosphere at 100 kPa. A microwave output is 1.5 kW. The residence time inside the furnace is 120 seconds, and the fibers can be carbonized until they have a density of 1.60 g/cm³.

The inside of the second carbonization furnace is maintained in a nitrogen atmosphere at 4 kPa. Plasma is generated with a microwave output of 0.5 kW. The residence time inside the furnace is 60 seconds, and the fibers can be carbonized until they have a density of 1.78 g/cm³.

The inside of the third carbonization furnace is maintained in a nitrogen atmosphere at 100 kPa. The temperature inside the furnace is set at 1,650° C. by the electric heater. The residence time inside the furnace is 360 seconds, and the fibers can be carbonized until they have a density of 1.80 g/cm³.

Note that the produced carbon fibers have a tensile strength of 3.8 GPa and a tensile modulus of 290 GPa.

Embodiment 8

A working example of Embodiment 8 will now be described.

In Embodiment 8, three carbonization furnaces are provided, of which the first carbonization furnace heats fibers using an electric heater, the second carbonization furnace heats fibers using plasma, and the third carbonization furnace heats fibers using plasma.

The inside of the first carbonization furnace is maintained in a nitrogen atmosphere at 100 kPa. The temperature inside the furnace is set at 500° C. by the electric heater. The residence time inside the furnace is 120 seconds, and the fibers can be carbonized until they have a density of 1.50 g/cm³.

The inside of the second carbonization furnace is maintained in a nitrogen atmosphere at 1 kPa. Plasma is generated with a microwave output of 1.0 kW. The residence time inside the furnace is 20 seconds, and the fibers can be carbonized until they have a density of 1.70 g/cm³.

The inside of the third carbonization furnace is maintained in a nitrogen atmosphere at 10 kPa. Plasma is generated with a microwave output of 5.0 kW. The residence time inside the furnace is 20 seconds, and the fibers can be carbonized until they have a density of 1.80 g/cm³.

Note that the produced carbon fibers have a tensile strength of 4.0 GPa and a tensile modulus of 235 GPa.

Embodiment 9

A working example of Embodiment 9 will now be described.

In Embodiment 9, three carbonization furnaces are provided, of which the first carbonization furnace heats fibers using an electric heater, the second carbonization furnace heats fibers using microwaves, and the third carbonization furnace heats fibers using plasma.

The inside of the first carbonization furnace is maintained in a nitrogen atmosphere at 100 kPa. The temperature inside the furnace is set at 500° C. by the electric heater. The residence time inside the furnace is 120 seconds, and the fibers can be carbonized until they have a density of 1.50 g/cm³.

The inside of the second carbonization furnace is maintained in a nitrogen atmosphere at 100 kPa. A microwave output is 1.5 kW. The residence time inside the furnace is 30 seconds, and the fibers can be carbonized until they have a density of 1.60 g/cm³.

The inside of the third carbonization furnace is maintained in a nitrogen atmosphere at 10 kPa. Plasma is generated with a microwave output of 5.0 kW. The residence time inside the furnace is 30 seconds, and the fibers can be carbonized until they have a density of 1.78 g/cm³.

Note that the produced carbon fibers have a tensile strength of 3.8 GPa and a tensile modulus of 235 GPa.

Embodiment 10

A working example of Embodiment 10 will now be described.

In Embodiment 10, three carbonization furnaces are provided, of which the first carbonization furnace heats fibers using an electric heater, the second carbonization furnace heats fibers using an electric heater, and the third carbonization furnace heats fibers using plasma.

The inside of the first carbonization furnace is maintained in a nitrogen atmosphere at 100 kPa. The temperature inside the furnace is set at 600° C. by the electric heater. The residence time inside the furnace is 180 seconds, and the fibers can be carbonized until they have a density of 1.55 g/cm³.

The inside of the second carbonization furnace is maintained in a nitrogen atmosphere at 100 kPa. The temperature inside the furnace is set at 500° C. by the electric heater. The residence time inside the furnace is 300 seconds, and the fibers can be carbonized until they have a density of 1.78 g/cm³.

The inside of the third carbonization furnace is maintained in a nitrogen atmosphere at 10 kPa. Plasma is generated with a microwave output of 5.0 kW. The residence time inside the furnace is 60 seconds, and the fibers can be carbonized until they have a density of 1.80 g/cm³.

Note that the produced carbon fibers have a tensile strength of 4.5 GPa and a tensile modulus of 290 GPa.

Embodiment 11

A working example of Embodiment 11 will now be described.

In Embodiment 11, three carbonization furnaces are provided, of which the first carbonization furnace heats fibers using microwaves, the second carbonization furnace heats fibers using an electric heater, and the third carbonization furnace heats fibers using plasma.

The inside of the first carbonization furnace is maintained in a nitrogen atmosphere at 100 kPa. A microwave output is 1.5 kW. The residence time inside the furnace is 120 seconds, and the fibers can be carbonized until they have a density of 1.60 g/cm$^3$.

The inside of the second carbonization furnace is maintained in a nitrogen atmosphere at 100 kPa. The temperature inside the furnace is set at 500° C. by the electric heater. The residence time inside the furnace is 240 seconds, and the fibers can be carbonized until they have a density of 1.77 g/cm$^3$.

The inside of the third carbonization furnace is maintained in a nitrogen atmosphere at 10 kPa. Plasma is generated with a microwave output of 5.0 kW. The residence time inside the furnace is 90 seconds, and the fibers can be carbonized until they have a density of 1.80 g/cm$^3$.

Note that the produced carbon fibers have a tensile strength of 4.3 GPa and a tensile modulus of 300 GPa.

TABLE 1

| | | Working Ex. 1 | Working Ex. 2 | Working Ex. 3 | Working Ex. 4 | Working Ex. 5 | Comparative Ex. |
|---|---|---|---|---|---|---|---|
| First Carbonization Furnace | Heating Means | Microwaves | Microwaves | Plasma | Plasma | Electric Heater | Electric Heater |
| | Output or Treatment Temperature | 1.5 kW | 1.5 kW | 1.0 kW | 1.5 kW | 600° C. | 600° C. |
| | Residence Time (sec) | 120 | 120 | 15 | 30 | 180 | 180 |
| | Pressure (kPa) | 100 | 100 | 1 | 1 | 100 | 100 |
| | Density Reached (g/cm$^3$) | 1.60 | 1.60 | 1.55 | 1.76 | 1.55 | 1.55 |
| Second Carbonization Furnace | Heating Means | Plasma | Plasma | Plasma | Electric Heater | Plasma | Electric Heater |
| | Output or Treatment Temperature | 0.5 kW | 0.8 kW | 3.0 kW | 1,400° C. | 0.5 kW | 1,500° C. |
| | Residence Time (sec) | 60 | 60 | 30 | 240 | 50 | 240 |
| | Pressure (kPa) | 4 | 3 | 8 | 100 | 4 | 100 |
| | Density Reached (g/cm$^3$) | 1.78 | 1.76 | 1.80 | 1.79 | 1.77 | 1.78 |
| Properties | Tensile Strength (GPa) | 3.7 | 3.5 | 3.5 | 5.0 | 4.0 | 5.0 |
| | Tensile Modulus (GPa) | 230 | 220 | 235 | 240 | 240 | 245 |

TABLE 2

| | | Working Ex. 6 | Working Ex. 7 | Working Ex. 8 | Working Ex. 9 | Working Ex. 10 | Working Ex. 11 | Comparative Ex. |
|---|---|---|---|---|---|---|---|---|
| First Carbonization Furnace | Heating Means | Electric Heater | Microwaves | Electric Heater | Electric Heater | Electric Heater | Microwaves | Electric Heater |
| | Output or Treatment Temperature | 600° C. | 1.5 kW | 500° C. | 500° C. | 600° C. | 1.5 kW | 600° C. |
| | Residence Time(sec) | 180 | 120 | 120 | 120 | 180 | 120 | 180 |
| | Pressure (kPa) | 100 | 100 | 100 | 100 | 100 | 100 | 100 |
| | Density Reached (g/cm$^3$) | 1.55 | 1.60 | 1.50 | 1.50 | 1.55 | 1.60 | 1.55 |
| Second Carbonization Furnace | Heating Means | Plasma | Plasma | Plasma | Microwaves | Electric Heater | Electric Heater | Electric Heater |
| | Output or Treatment Temperature | 0.5 kW | 0.5 kW | 1.0 kW | 1.5 kW | 500° C. | 500° C. | 1,500° C. |
| | Residence Time(sec) | 50 | 60 | 20 | 30 | 300 | 240 | 240 |
| | Pressure (kPa) | 4 | 4 | 1 | 100 | 100 | 100 | 100 |
| | Density Reached (g/cm$^3$) | 1.77 | 1.78 | 1.70 | 1.60 | 1.78 | 1.77 | 1.78 |
| Third Carbonization Furnace | Heating Means | Electric Heater | Electric Heater | Plasma | Plasma | Plasma | Plasma | |
| | Output or Treatment Temperature | 1,600° C. | 1,650° C. | 5.0 kW | 5.0 kW | 5.0 kW | 5.0 kW | |
| | Residence Time(sec) | 300 | 360 | 20 | 30 | 60 | 90 | |
| | Pressure (kPa) | 100 | 100 | 10 | 10 | 10 | 10 | |
| | Density Reached (g/cm$^3$) | 1.8 | 1.8 | 1.8 | 1.78 | 1.8 | 1.8 | |
| Properties | Tensile Strength (GPa) | 4.2 | 3.8 | 4.0 | 3.8 | 4.5 | 4.3 | 5.0 |
| | Tensile Modulus (GPa) | 285 | 290 | 235 | 235 | 290 | 300 | 245 |

Modification Examples

Although the present invention has been described based on Embodiments 1 to 11, the present invention is not limited to Embodiments 1 to 11. For example, any of Embodiments 1 to 11 may be combined with modification examples described below as appropriate, and two or more of the modification examples may be combined as appropriate.

1. Carbon Fibers

Although the embodiments describe a method of producing carbon fibers made up of 12,000 filaments, the embodiments are also applicable to carbonization of precursor fibers made up of 3,000 filaments, 6,000 filaments, 24,000 filaments, or other numbers of filaments, and to a method of producing carbon fibers from such precursor fibers.

The embodiments describe a carbon fiber production method including carbonization processes. For example, graphitizing treatment may be further performed before a surface treatment process. That is, although the embodiments describe a method of producing mainly standard carbon fibers (with an elastic modulus of 240 GPa), its carbonization processes are applicable also to carbonization of precursor fibers for high-performance carbon fibers, such as carbon fibers with a high elastic modulus and carbon fibers with an intermediate elastic modulus and high strength. Naturally, they are applicable also to a method of producing high-performance carbon fibers.

2. Heating with Microwaves (1) Intensity of Microwaves

In Embodiment 1, the electric field strength adjustment mechanism 51 made of metal is provided in a region through which the oxidized fibers 1b pass inside the first carbonization furnace 15. The electric field strength adjustment mechanism 51 has the slits 51a that allow microwaves to pass through. The intensity of microwaves is adjusted by the number (density) of the slits 51a.

Alternatively, the intensity of microwaves may be adjusted using other methods. The following describes Modification Example 1 in which the inside of a first carbonization furnace is divided into a plurality of regions in the direction of conveyance of oxidized fibers, and the intensity of microwaves is changed in each region.

Figure 4A:
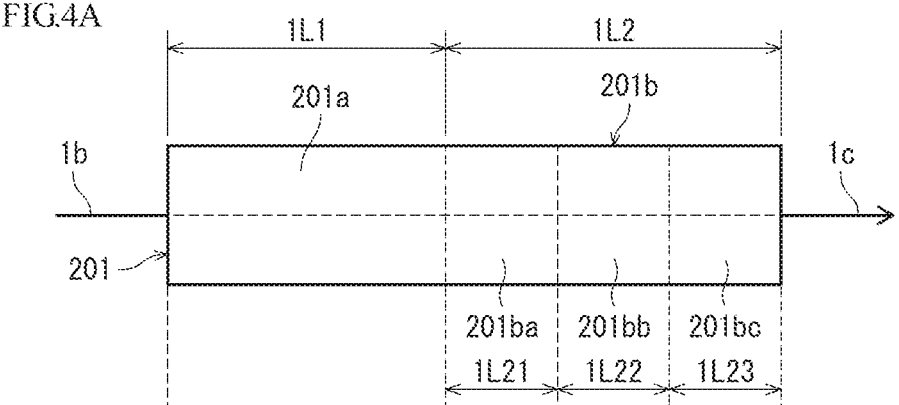
FIGS. 4A and 4B illustrate a first carbonization furnace according to Modification Example 1.
Figure 4B:
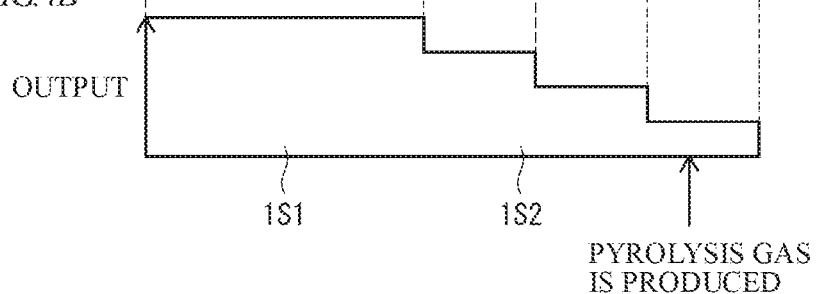

FIGS. 4A and 4B illustrate the first carbonization furnace according to Modification Example 1.

As shown in FIGS. 4A and 4B, a first carbonization furnace 201 has a first region 201a and a second region 201b. The first region 201a extends between the entrance of the first carbonization furnace 201 and a position away from the entrance by a distance 1L1 toward the exit of the first carbonization furnace 201. The second region 201b extends between the position away from the entrance by the distance 1L1 and the exit away from this position by a distance 1L2.

A magnetron serving as a microwave oscillator is provided in the first region 201a. An output of microwaves 1S1 in the first region 201a is maintained constant.

The second region 201b is further divided into a plurality of subregions. In the present example, the second region is divided into three subregions. The three subregions are a first subregion 201ba, a second subregion 201bb, and a third subregion 201bc that are located in this order in the direction of conveyance of oxidized fibers 1b, with the first subregion 201ba being closest to the first region 201a.

As shown in FIG. 4A, the subregions 201ba, 201bb, and 201bc have the distances (lengths) of 1L21, 1L22, and 1L23, respectively, in the direction of conveyance. These lengths 1L21, 1L22, and 1L23 are the same.

The subregions 201ba, 201bb, and 201bc are provided with their respective magnetrons serving as microwave oscillators. Thus, in each of the subregions 201ba, 201bb, and 201bc, microwaves can be output independently of other subregions.

As shown in FIG. 4B, the output of microwaves 1S2 in the subregions 201ba, 201bb, and 201be decreases in steps as the distance to the exit of the first carbonization furnace 201 decreases. Note that the output of microwaves 1S2 in any of the subregions 201ba, 201bb, and 201be is smaller than the output of microwaves 1S1 in the first region 201a.

(2) Distribution of Intensity of Microwaves

In Embodiment 1, the first carbonization process of the carbonization processes applies microwaves S1 of a constant intensity to the oxidized fibers 1b in the first region 15a, as shown in FIG. 2B.

Alternatively, the intensity of microwaves applied in the first region in the first carbonization process may not be constant. The following describes Modification Example 2 in which the intensity of microwaves is changed.

Figure 5A:
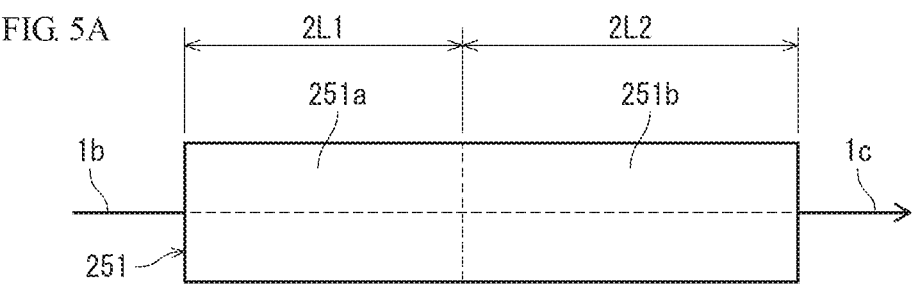
FIGS. 5A to 5C are conceptual diagrams showing a heated state in a first carbonization process according to Modification Example 2.
Figure 5B:
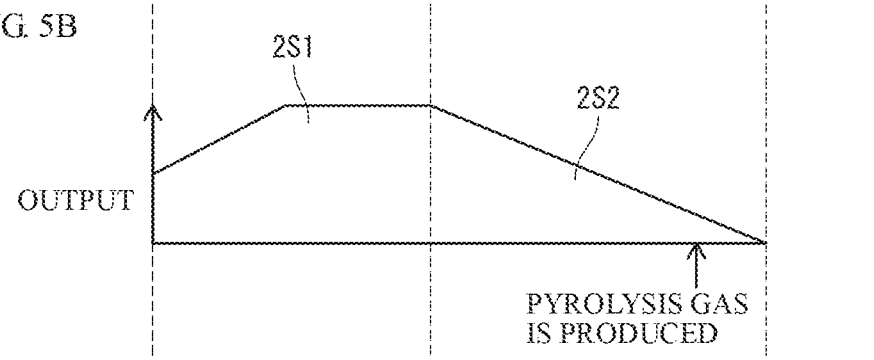
Figure 5C:
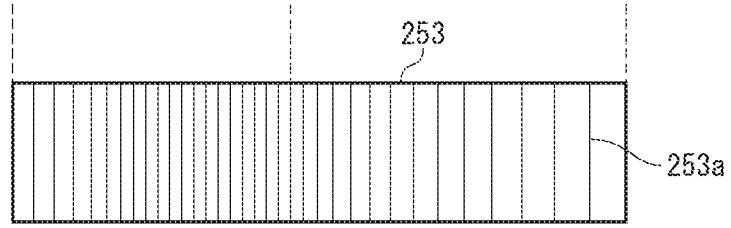

FIGS. 5A to 5C are conceptual diagrams showing a heated state in a first carbonization process according to Modification Example 2.

FIG. 5A shows a first carbonization furnace. FIG. 5B shows the distribution of intensity of microwaves with which oxidized fibers are irradiated when passing through the inside of the first carbonization furnace. FIG. 5C is a schematic diagram showing an electric field strength adjustment mechanism inside the first carbonization furnace.

In FIGS. 5B and 5C, the horizontal axes indicate the length of the first carbonization furnace in the direction of conveyance of oxidized fibers 1b.

In the first carbonization furnace according to Modification Example 2, microwave irradiation is performed to have the following intensity distribution. The oxidized fibers 1b are irradiated with microwaves first with the intensity increasing as the distance from the entrance of the first carbonization furnace increases in the direction of conveyance of the oxidized fibers 1b. Then, the intensity of microwaves is maintained constant. Subsequently, the intensity of microwaves decreases as the distance to the exit of the first carbonization furnace decreases. Such an intensity distribution is enabled by the following structure.

A first carbonization furnace 251 has basically the same structure as the first carbonization furnace 15 according to Embodiment 1. That is, the first carbonization furnace 251 includes a first furnace body, a magnetron, and an electric field strength adjustment mechanism 253 with a plurality of slits 253a. Note that the intensity of microwaves applied to the oxidized fibers 1b is adjusted by the density of the slits 253a.

As shown in FIG. 5A, the first carbonization furnace 251 has a first region 251a and a second region 251b. The first region 251a has a length 2L1 and the second region 251b has a length 2L2 in the direction of conveyance of the oxidized fibers 1b.

A plurality of slits 253a corresponding to the first region 251a are arranged as follows. In a region from the entrance of the first carbonization furnace 251 to the substantial center of the first region 251a in the direction of conveyance, the slits 253a are arranged at intervals decreasing as the distance from the entrance increases. In a region from the substantial center to the border with the second region 251b, the slits 253a are arranged at equal intervals.

Similarly to Embodiment 1, a plurality of slits 253a corresponding to the second region 251b are arranged at intervals increasing in the direction of conveyance of the oxidized fibers 1b as the distance to the exit of the first carbonization furnace 251 decreases.

The above structure enables the oxidized fibers 1b that are being conveyed inside the first carbonization furnace 251 to be irradiated with microwaves 2S1 that change in intensity in the first region 251a as indicated by the intensity distribution of FIG. 5B.

3. Heating with Plasma (1) Heating Means

In Embodiment 1, plasma is generated using an arc discharge. In Embodiment 2, plasma is generated using surface waves. Alternatively, plasma may be generated using other methods, including inductively heating gas using a high-frequency electromagnetic field.

(2) Types of Plasma

In Embodiments 1 to 11, plasma is generated in a nitrogen atmosphere.

Alternatively, plasma may be generated using other inert gases.

REFERENCE SIGNS LIST 1 fibers
1a precursor
1b oxidized fibers
1c fibers that have undergone first carbonization treatment
15 first carbonization furnace
15a first region
15b second region
17 second carbonization furnace
21 roller
23 roller
51 electric field strength adjustment mechanism
51a spacer

The invention claimed is:

1. A carbonization method of carbonizing precursor fibers that are being conveyed, the carbonization method comprising:
   carbonizing fibers by heating through a plurality of carbonization furnaces that are arranged in a direction in which the fibers are conveyed, wherein
   the plurality of carbonization furnaces include at least one carbonization furnace that heats the fibers using plasma when the fibers are passing through an inside of the at least one carbonization furnace, and the at least one carbonization furnace is located second or later from an upstream side of the direction of conveyance of the fibers among the plurality of carbonization furnaces, and
   the fibers, that have passed through a carbonization furnace that is located first from the upstream side of the direction of conveyance of the fibers among the plurality of carbonization furnaces, have a density of not less than 1.50 g/cm³.

2. The carbonization method according to claim 1, wherein
   the at least one carbonization furnace heats the fibers by generating plasma and passing the fibers through the generated plasma.

3. The carbonization method according to claim 1, wherein
   the at least one carbonization furnace heats the fibers by generating plasma and irradiating the fibers with the generated plasma.

4. The carbonization method according to claim 1, wherein
   the at least one carbonization furnace is located second from the upstream side of the direction of conveyance of the fibers among the plurality of carbonization furnaces.

5. The carbonization method according to claim 4, wherein
   the carbonization furnace that is located first heats the fibers using microwaves and/or plasma.

6. The carbonization method according to claim 5, wherein
   the carbonization furnace that is located first includes a first stage and a second stage, the first stage heating the fibers by applying constant or increasing energy to be converted into heat to the fibers, the second stage heating the fibers after the first stage by applying energy to be converted into heat to the fibers, the energy applied in the second stage being lower than the energy applied at an end of the first stage, and
   the first stage ends before an amount of gas produced from the fibers by heating reaches a peak thereof.

7. The carbonization method according to claim 6, wherein
   the second stage heats the fibers by applying the energy to be converted into heat to the fibers while gradually reducing the energy to allow a reaction of the fibers to progress mildly.

8. The carbonization method according to claim 6, wherein
   the fibers that have completed the first stage have a density of not more than 1.60 g/cm³.

9. The carbonization method according to claim 1, wherein the inside of the at least one carbonization furnace has an inert gas atmosphere.

10. The carbonization method according to claim 1, wherein the precursor fibers have been spun by wet spinning or wet-dry spinning.

11. The carbonization method according to claim 1, wherein
    the at least one carbonization furnace is located second from the upstream side of the direction of conveyance of the fibers among the plurality of carbonization furnaces, and
    a tension applied to the fibers when the fibers are conveyed inside the carbonization furnace that is located second is 1.0 to 5.0 times a tension applied to the fibers when the fibers are conveyed inside the carbonization furnace that is located first.

12. A carbon fiber production method including a carbonization process of carbonizing precursor fibers that are being conveyed,
    wherein the carbonization process is performed with the carbonization method according to claim 1.

* * * * *